United States Patent [19]

Stein

[11] Patent Number: 5,365,358
[45] Date of Patent: Nov. 15, 1994

[54] OPTICAL SWITCHING EQUIPMENT FOR THE THROUGH-CONNECTION OF OPTICAL MESSAGE CELLS

[75] Inventor: Karl-Ulrich Stein, Unterhaching, Germany

[73] Assignee: Siemens Aktiengesellschaft, Munich, Germany

[21] Appl. No.: 110,995

[22] Filed: Aug. 24, 1993

[30] Foreign Application Priority Data

Sep. 16, 1992 [EP] European Pat. Off. ......... 92115840.8

[51] Int. Cl.$^5$ ............................................. H04J 14/00
[52] U.S. Cl. ................................... 359/117; 359/135; 370/91
[58] Field of Search .................. 359/117-118, 359/135-136, 138-140; 355/16, 24; 370/60-61, 91

[56] References Cited

U.S. PATENT DOCUMENTS

| | | | |
|---|---|---|---|
| 4,894,818 | 1/1990 | Fujioka et al. | 370/3 |
| 5,005,167 | 9/1991 | Arthurs et al. | 319/135 |
| 5,091,905 | 2/1992 | Amada | 359/135 |
| 5,144,465 | 9/1992 | Smith | 319/117 |
| 5,170,272 | 12/1992 | Onno | 370/91 |

FOREIGN PATENT DOCUMENTS

| | | |
|---|---|---|
| 0313389 | 4/1989 | European Pat. Off. |
| 0517092 | 12/1992 | European Pat. Off. |
| 58-020042 | 2/1983 | Japan |
| 60-047588 | 3/1985 | Japan |
| 1256846 | 10/1989 | Japan |
| WO91/04642 | 4/1991 | WIPO |

OTHER PUBLICATIONS

Electronics Letters, vol. 26, No. 22, Oct. 25, 1990, "40 Gbit/s Optial Time–Division Cell Multiplexer for a Photonic ATM Switch", M. Tsukada et al pp. 1895–1897.
IEEE Global Telecommunications Conference, vol. 3, No. 3, Nov. 15, 1987, "A Photonic Knockout Switch for High–Speed Packet Networks", Kai Y. Eng, pp. 1861–1865.
Telcom Report 11, 6, (1988), "ATM ermöglicht unterschiedliche Bitraten im einheitlichen Breitbandnetz" Dipl.-Ing. Karl Anto Lutz, pp. 210–213.

Primary Examiner—Richard E. Chilcot, Jr.
Assistant Examiner—Kinfe-Michael Negash
Attorney, Agent, or Firm—Hill, Steadman & Simpson

[57] ABSTRACT

An optical switching network for through-connecting optical message cells has at least one optical space-switching multiple connected at its input side to the inputs thereof and has at least one optical transit time harp formed with a plurality of light waveguides with graduated transit times of whole-number, n-multiples (with $n \geq 0$) of the message cell duration. The outputs of a transit time harp following a space-switching multiple are respectively combined to a concentrator output of the optical switching network.

15 Claims, 3 Drawing Sheets

OPTICAL SWITCHING EQUIPMENT FOR THE THROUGH-CONNECTION OF OPTICAL MESSAGE CELLS

BACKGROUND OF THE INVENTION

The asynchronous transfer mode (ATM) based on an asynchronous time-division multiplex technique plays an important part in recent developments of telecommunications technology and in the development of integrated services broadband networks (B-ISDN). In this mode the signal transmission ensues in a bit stream which is subdivided into cells. Each cell, composed of a header part and a useful information part, has a constant length of, for example, 53 octets that are occupied as needed with packeted messages. When useful information is not to be communicated at the moment, then specific dummy cells are transmitted. Virtual connections are set up in ATM switching centers. The virtual connections are connections that actually only use a route section when a message packet (block) is actually to be communicated thereover. The header of each packet contains, among other things, an address covering, for example, two octets for the unambiguous allocation of the packet to a specific virtual connection. In accordance with the respective dial information, each packet can thereby receive the complete information for its route through the switching network at the input to the switching network. The switching elements then through-connect the packet on the defined route themselves (self-routing network; see, for example, Telcom Report 11 (1988) 6, 210 ... 213).

When one forgoes a header translation or implements this in electronic devices, switching networks for ATM message cells can also be realized with optically transparent devices for queuing and routing functions.

For example, European reference EP-A2-0 313 389 (corresponding to U.S. Pat. No. 4,894,818) discloses an optical packet switching system having optical 2×2 coupling switches arranged in switching stages. Every coupling switch has buffer memory means at its two inputs that lead to the input of an optical switch-over means whose two outputs form the two coupling switch outputs. The optical switch-over means is preceded in the light waveguide path by an optical demultiplexer with which only light having a wavelength defined individually per switching stage can be coupled out from a routing header. Proceeding from this demultiplexer, the optical switch-over means following in the light waveguide path is controlled via an optoelectric transducer. The optical switch-over means enters into one or the other of its switch states dependent on whether or not the wavelength defined for the appertaining switching stage is contained in the routing header.

In order to avoid cell losses, it is thereby known to provide cell memories that are composed of a fed back line of the switching network having a delay of at least one cell duration. In this known light waveguide telecommunication system, both routing functions as well as associated queuing functions connected therewith in order to avoid cell losses are optically implemented. However, the queuing functions are limited to the insertion of message packets of two input lines onto a common, continuing line.

The same queuing principle can also be employed for a switching matrix wherein the switching matrix outputs are connected to switching matrix inputs via light waveguide delay lines having graduated transit times equal to the message cell duration or to a multiple thereof.

For example, a single-stage or multi-stage ATM switching network is known wherein respectively two successive, optical space switching multiples are connected to one another by light waveguides having a negligibly short transit time as well as by optical intermediate memories. Message cells can then be through-connected across the optical switching network undelayed or with different delays as needed. The optical intermediate storage thereby occurs in an optical apparatus, hereinafter referred to as an optical transit time harp, consisting of a plurality of light waveguides having graduated transit times whose transit times are equal to whole-number n-multiples of the message cell duration in order to avoid cell losses given occupied switching network outputs (see European reference EP-92108243.4). Additionally or alternatively, an optical switching network can have a part of the outputs of an optical space-switching multiple connected to a corresponding plurality of inputs of the space-switching multiple via an optical transit time harp formed with a plurality of light waveguides having graduated transit times. As a result message cells can be through-connected across the optical switching network practically undelayed or with different delays as needed. The transit time harp can have light waveguides having graduated transit times that are shorter than the duration of a message cell in order to reduce a more or less pronounced jitter of message cells that occur unsynchronized (see German reference DE-A1-4 216 077).

SUMMARY OF THE INVENTION

An elementary function unit for switching networks having routing and queuing functions is a concentrator that allows message cells statistically (synchronously or asynchronously) arriving on a plurality of input lines to successively appear on an output line. It is an object of the present invention to provide an expedient realization of such a concentrator function with opto-technical means.

The present invention is directed to an optical switching network for through-connection of optical message cells, having at least one optical space-division multiple that has its input side connected to the inputs of the optical switching network and having at least one optical transit time harp formed with a plurality of light waveguides having graduated transit times of whole-number n-multiples (where n≧0) of the message cell duration. Such an optical switching network is inventively characterized in that the outputs of an optical transit time harp that has its input side connected to the outputs of a space-switching multiple are combined at an output of the optical switching network via a common optical multiplexer. In a further development of the present invention, the optical message cells in the space switching multiple can be through-connected to the following transit time harp in accord with the arrival of message cells at the inputs of the space switching multiple. This is done in such a way that successively occurring message cells up to a first-time, simultaneous occurrence of a plurality of message cells traverse the light waveguides with a transit time equal to the zero multiple of the message cell duration, that, given the first-time, simultaneous appearance of m message cells, these message cells respectively traverse another of m light waveguides of the transit time harp having transit times equal to the zero multiple through (m−1) multiple of the message cell duration. Respective message cells occurring individually thereafter successively traverse the light waveguide having the respectively longest transit time made use of immediately therebefore, whereas respectively n simultaneously occurring message cells respectively traverse another of n light waveguides of the transit time harp having transit times equal to the respectively longest transit time made use of immediately therebefore. The also have transit time durations that are next greater than n−1 in the transit time graduation. Given every non-occurrence of any and all message cells, the light waveguide having the transit time shorter by one message cell duration is now declared to be the current light waveguide having the longest transit time just made use of instead of the light waveguide having the respectively longest transit time just made use of therebefore.

The present invention has the advantage of realizing an optical switching network to be advantageously utilized, for example, even at bit rates in the range of more than 1 Gbit/s in a simple way and of being able to operate it with surveyable control algorithms.

From the prior art (from the Patent Abstracts of Japan for JP-A-1256846) it is known for realizing a concentrator function to provide an optical switching network for the through-connection of optical message cells having an optical space-switching multiple with its input side connected to the inputs of the optical switching network as well as having a group of eight light waveguides having transit times identical to one another and a cascade of seven multiplexers. Beginning with the first multiplexer, whose two inputs are respectively connected to the two first outputs of the space-switching multiple via one of the light waveguides, the output of the respective multiplexer thereby leads to a respective input of the multiplexer respectively following in the series. A respective second of this multiplexer input is connected via one of the light waveguides to the respective next output of the space-switching multiple. Finally, the output of the last multiplexer of the cascade of multiplexers leads directly to the output of the concentrator.

This known concentrator requires a corresponding plurality of multiplexers in a circuit part tapered with a cascade of multiplexers, whereas the present invention which employs an optical transit time harp having light waveguides with graduated transit times only requires a single multiplexer and can be more simply realized in comparison thereto.

The present invention can be further developed to the affect that the outputs of a space-switching multiple of a first space switching stage are respectively connected to an input of an optical transit time harp whose outputs are combined at an input of a space-switching multiple of a second space-switching stage. The outputs of a space-switching multiple of a last space-switching stage are respectively connected to another input of an optical transit time harp whose outputs are combined at an output of the optical switching network.

In a further development of the present invention, the outputs of a space-switching multiple, particularly of a first space-switching stage can form a plurality of groups of outputs whose individual outputs are connected to the individual inputs of respectively one and the same transit time harp of a group of optical transit time harps, whereby the outputs of each such transit time harp are combined at a common output, particularly at an output leading to the input of a space-switching multiple of the last space-switching stage.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
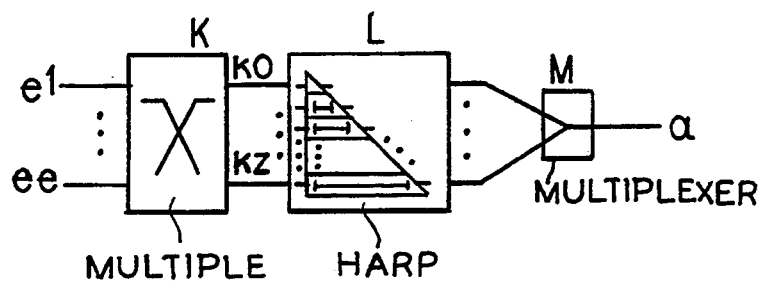
FIG. 1 is a schematic illustration of a single-stage, optical concentrator means having a transit time harp.

In a scope necessary for an understanding of the present invention, FIG. 1 shows an exemplary embodiment of a single-stage optical coupling means for through-connection of optical message cells that provides a concentrator function. This optical switching network has an optical space-switching multiple K whose inputs represent the inputs e1, . . . , ee of the switching network. The inputs of an optical transit time harp L formed with a plurality of light waveguides having graduated transit times that are equal to whole-number, n-multiples (with $n \geq 0$) of the message cell duration are connected to the outputs k0, . . . , kz of the space-switching multiple K. The outputs of this optical transit time harp L are combined at the output line a of the optical switching network by a standard optical multiplexer M.

Figure 2:
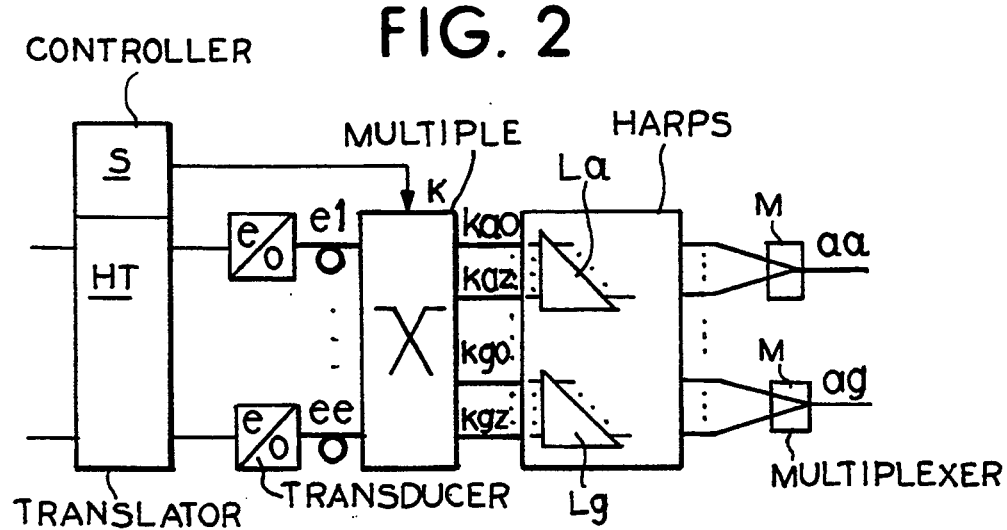
FIG. 2 is a schematic illustration of such a concentrator means having a plurality of transit time harps.

As may be seen from FIG. 2, the outputs of the space-switching multiple K can also be divided into groups of outputs ka0, . . . , kaz; kg0, . . . , kgz whose individual outputs (for example, ka0, . . . , kaz) are connected to the individual inputs of respectively one and the same optical transit time harp (for example, La) of a group of transit time harps La, . . . , Lg. The outputs of each such transit time harp are respectively combined at a different concentrator output aa, . . . , ag.

As may further be seen from FIG. 2, the inputs e1, . . . , ee of the optical space-switching multiple K can be connected (potentially via delay lines) to electro-optical transducers e/o that in turn follow an electrical header translator HT connected to a switching matrix controller S. In such a header translator, the headers are replaced according to ATM technology standards and the message cells to be electro-optically converted thereafter are placed in corresponding cell spacings. The corresponding control signals for controlling the space-switching multiple K, depicted in FIG. 1 and in FIG. 2, are thereby also derived. The optical space-switching multiples K in FIG. 1 and in FIG. 2 can, for example, be implemented as Benes-Banyan networks having electrically controlled, optical switches in one of the technologies of integrated optics. The optical transit time harps (harp L in FIG. 1; harps La, ... ,Lg in FIG. 2) can each be respectively formed by a plurality of light waveguides of a corresponding transit time connected parallel to one another at their output sides or can also be formed by a longer light waveguide provided with a plurality of taps.

Figure 3:
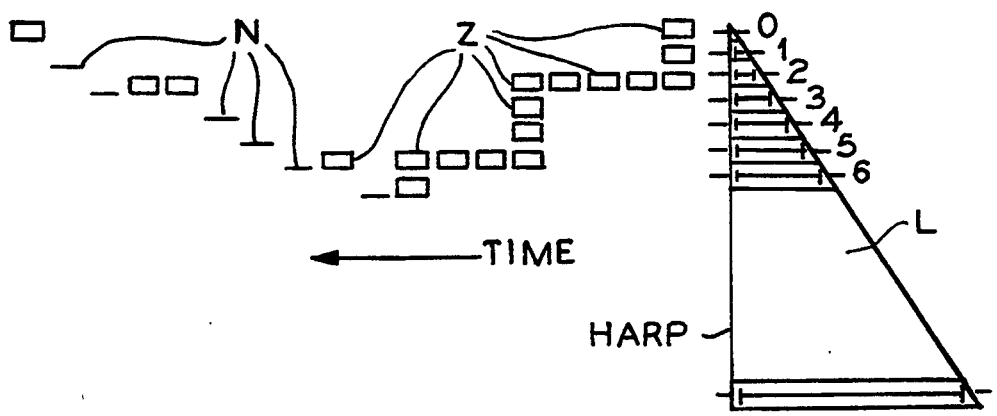
FIG. 3 schematically depicts the through-connection of message cells to the individual light waveguides of a transit time harp.

Let statistically distributed optical message cells arrive at the e inputs e1, ... ,ee of the concentrator means depicted in FIG. 1. Message cells successively arriving at one and the same input are assumed to have a respectively defined minimum chronological spacing from one another that is adequate for switching in the optical switching network and, potentially, that is also adequate for jitter compensation. What can then be effected by means of the transit time harp L is that simultaneously arriving message cells (in the worst case, e message cells can arrive simultaneously, i.e. one message cell at each of the inputs e1, ... ,ee) sequentially appear at the output a of the transit time harp L with the required minimum spacing, to which end the space-switching multiple K, controlled by an electrical control means S in FIG. 2 through-connects the appertaining message cells to the inputs k0, ... ,kz of the transit time harp L respectively coming into consideration in accord with the arrival of message cells at the inputs e1, ... ,ee of the space-switching multiple K. FIG. 3 shows how the through-connection of message cells statistically arriving at the inputs at a space-switching multiple to the individual light waveguides of a following transit time harp can occur in an especially expedient way.

FIG. 3 indicates message cells Z that simultaneously or successively arrived, these thereby having potentially arrived at arbitrary inputs (e1, ... , ee in FIG. 1) of the optical space-switching multiple K in FIG. 1. Those times at which a message cell does not arrive at any input (e1, ... , ee in FIG. 1) of the optical space-switching multiple K in FIG. 1 are referenced N in FIG. 3. The message cells Z are shown in FIG. 3 dependent on the time that they appear at the outputs (k0, ... , kz in FIG. 1) thereof according to their arrival at the inputs (e1, ... , ee in FIG. 1) of the space-switching multiple K in FIG. 1. They then experience cell transit times indicated with 0, 1, 2, 3, 4, 5, 6, ... , z at the right in FIG. 3 in the following transit time harp (harp L in FIG. 1). Successively arriving message cells thereby traverse the light waveguide having a transit time equal to the zero-multiple of the message cell duration up to a first-time, simultaneous arrival of a plurality of message cells.

Given a first-time, simultaneous arrival of m (equals 3 in FIG. 3) message cells, these message cells respectively traverse m ( equals 3) light waveguides of the transit time harp having transit times (0, 1, 2 in FIG. 3) equal to the zero-multiple through the (m−1)-multiple of the message cell duration.

In the example of FIG. 3, three individual message cells have each respectively arrived thereafter. Such individual message cells arriving successively traverse the light waveguide having the respectively longest transit time made use of immediately therebefore. In the example, this is the light waveguide having the cell transit time 2.

When, as indicated in FIG. 3 for the next four message cells, respectively n message cells simultaneously arrive, then these message cells respectively traverse n light waveguides of the transit time harp having transit times equal to the respectively longest transit time made use of immediately therebefore and to the n−1 next longest transit time durations in the transit time graduation. In the example depicted in FIG. 3, these are the light waveguides having the cell transit times 2, 3, 4 and 5.

Next in the example of FIG. 3, two message cells have again subsequently arrived individually, these successively traversing the light waveguide having the respectively longest transit time made use of immediately therebefore, i.e. the light waveguide having the cell transit time 5.

Next in the example of FIG. 3, two message cells have subsequently again arrived simultaneously, whereof respectively one traverses the light waveguide having the respectively longest transit time made use of immediately therebefore and the other traverses the light waveguide having the next longest transit time duration. In the example of FIG. 3, these are the cell transit times 5 and 6.

At every non-arrival of any and all message cells, i.e. when a message cell does not arrive at any of the inputs e1, ... , ee (in FIG. 1), the light waveguide having the transit time shorter by one message cell duration is now declared to be the current light waveguide having the longest transit time just made use of instead of the light waveguide having the respectively longest transit time just made use of immediately therebefore. In the example of FIG. 3, the message cell which individually arrived after a one-time non-arrival of any and all message cells traverses the light waveguide that is five cell transit times long and the next two message cells that respectively arrived individually after a following, three-time non-arrival of any and all message cells traverse the light waveguide having the cell transit time 2, which is shorter by another three cell transit times.

When, as also indicated in FIG. 3, a two-time non-arrival of any and all message cells occurs again thereafter, then a final message cell individually arriving thereafter is again through-connected to the light waveguide having the cell transit time zero.

Figure 4:
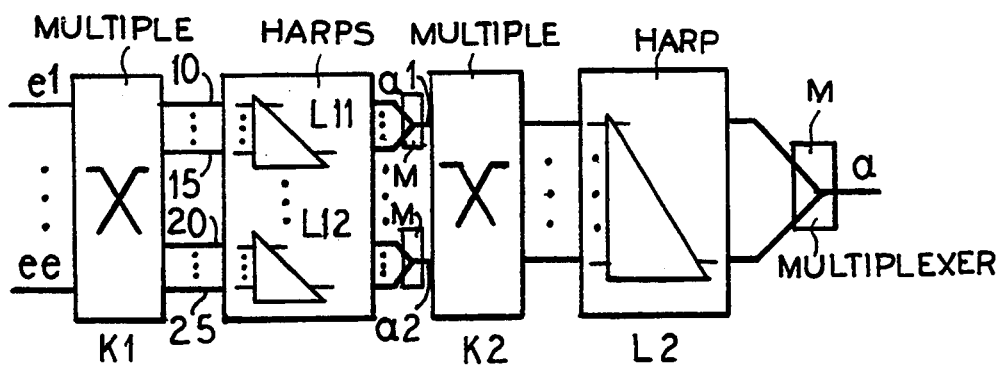
FIG. 4 schematically depicts an advantageous exemplary embodiment of a two-stage concentrator means.

The plurality of outputs of the space-switching multiple K (in FIG. 1) or, respectively, the plurality of inputs of the transit time harp L (in FIG. 1) and the maximum delay time in the transit time harp are designed according to the admissible cell loss probability at the required maximum load. When the known values for what is referred to as a knock-out switch are utilized as a reference value for the minimum plurality of light waveguides of the transit time harp, then, given an 80% load at the output, 12 lines are adequate in order to achieve a cell loss probability of less than $10^{-11}$. On the other hand, a maximum delay time is required in the transit time harp that is on the order of magnitude of the duration of 60 message cells. Under such boundary conditions, a single-stage transit time harp (having 60 inputs) would not be optimum. A two-stage switching network as outlined, for instance, in FIG. 4 is expedient under these circumstances. According to FIG. 4, the input lines e1, ... , ee of the optical switching network lead to a space-switching multiple K1 of a first space-switching stage whose 12 outputs (by way of example) form two groups of outputs 10, ... , 15; 20, ... , 25 whose individual outputs are connected to the individual inputs of two transit time harps L11 and L12. The outputs of each such transit time harp are respectively combined at a common output that, according to FIG. 2, leads to an input of an optical space-switching multiple K2 of a second space-switching stage. This space-switching multiple K2, for example, has 10 outputs that lead to corresponding inputs of a following transit time harp L2. The outputs of the transit time harp L2, finally, are combined at the output a of the switching network according to FIG. 4. The two transit time harps L11, L12 in the example thereby each respectively have 6 light waveguides whose transit time is equal to the duration of, in the example, 0, 1, 2, 3, 4 and 5 message cells, respectively, and the transit time harp L2 in the example has 10 light waveguides whose transit time is equal to the duration of, in the example, 0, 6, 12, 18, . . . 42, 48 and 54 message cells, respectively.

Let it be pointed out here that, given a low number (2 in the example) of lines proceeding between the first stage and the second stage (as in the above, numerical example), the second stage can also be recursively realized in that corresponding outputs of the first stage are returned to corresponding inputs of the first stage in a known way. Also, the transit time harps of the first stage consist of light waveguides having the transit times required in the transit time harp of the second stage.

Figure 5:
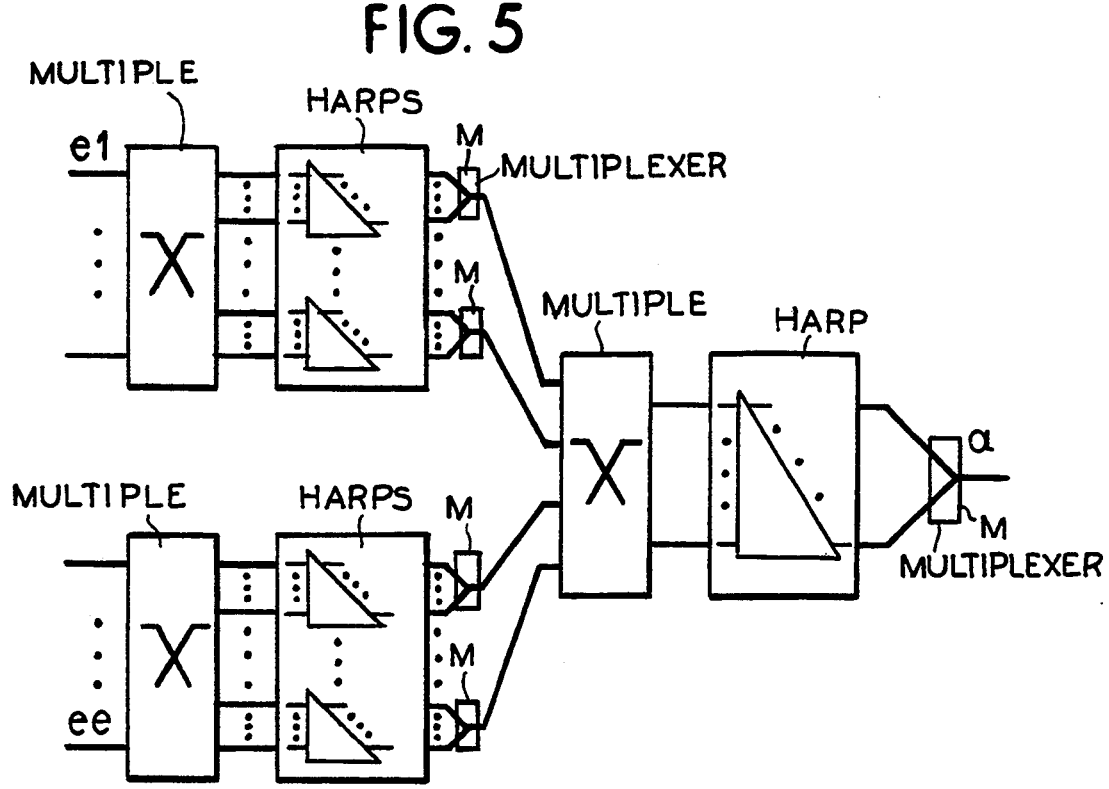
FIG. 5 depicts a further exemplary embodiment of a two-stage optical concentrator means.

FIG. 5 depicts another example of a multi-stage concentrator having a plurality of transit time harps or, respectively, one transit time harp per space-switching multiple. This example does not require any further explanation in that it operates in the manner described above.

In order to obtain an optical switching network having a plurality of inputs and a plurality of outputs, it is possible to connect in parallel a plurality of concentrators as shown, for example, in FIG. 1, FIG. 2, FIG. 4 and FIG. 5 at the input side and to thereby insert a selective element, for example a filter or a switch, in each connection leading from a multiple circuit point to a concentrator input. This results in the arrangement depicted in FIG. 6, for example.

Figure 6:
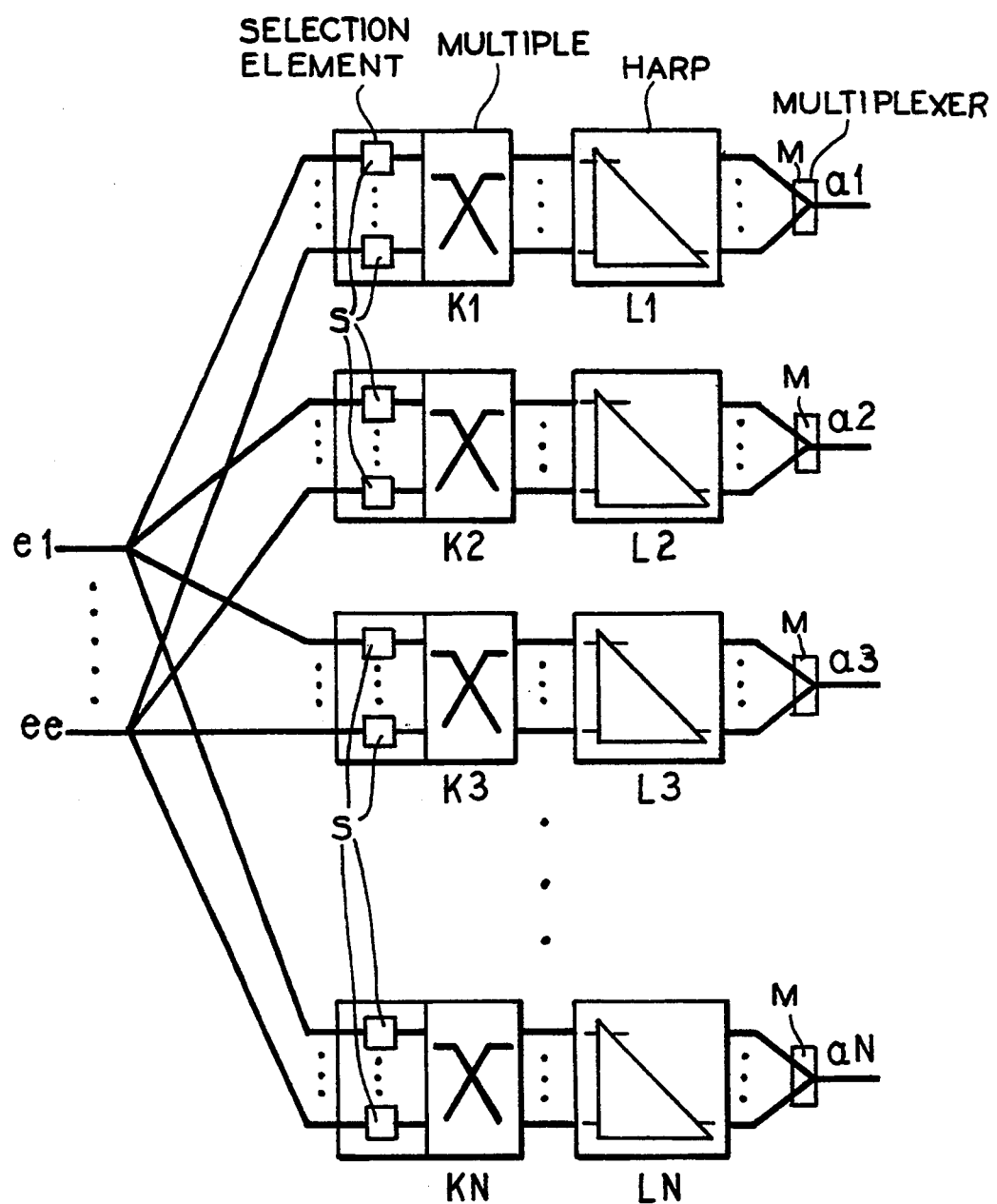
FIG. 6 depicts an expedient exemplary embodiment of a larger switching network formed with a plurality of optical concentrators.

The optical switching network according to FIG. 6 provides N concentrator means K1, L1; K2, L2; K3, L3; . . . , KN, LN, that respectively lead to one of N switching network outputs a1, a2, a3, . . . , aN. Each concentrator has e inputs that are each respectively optically connected to one of e switching network inputs e1, . . . , ee. A selection element S is thereby inserted into each such connection. These selection elements are controlled by output-associated characteristics of the message packets, so that each message packet arriving at one of the inputs e1, . . . , ee proceeds precisely to that output of the concentrator and, thus, switching network outputs a1, . . . , aN for which it is intended. A multi-casting is thereby also possible given a corresponding execution and control of the selection elements S.

An optical filter for an output-associated, optical wavelength can be provided as a selection element, whereby it is assumed that optical message packets destined for a specific output a1, . . . , aN of the switching network are input into the optical switching network with an output-associated optical wavelength.

An electrically controllable, optical switch can also be respectively provided as selection element S, this being respectively controlled by a control signal belonging to the respective message cell.

Let it also be noted in conclusion that the above-described concentrator means can also be employed in optical switching networks having structures other than those known in electrical switching technology without this having to be set forth in greater detail here since this is no longer required for an understanding of the present invention.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An optical switching network for through-connecting optical message cells and having inputs and at least one output, comprising:
   at least one optical space-switching multiple having inputs connected to the inputs of the optical switching network and having outputs;
   at least one optical transit time harp having a plurality of light waveguides having graduated transit times of whole-number, n-multiples, where $n \geq 0$, of a message cell duration, and having inputs and outputs;
   said at least one optical transit time harp having the inputs thereof connected to the outputs of said at least one space-switching multiple, the outputs of said at least one optical transit time harp being combined at the at least one output of the optical switching network via an optical multiplexer.

2. The optical switching network according to claim 1, wherein the optical switching network further comprises a plurality of space-switching stages having space-switching multiples and optical transit time harps, and wherein outputs of a space-switching multiple of a first space-switching stage are respectively connected to inputs of at least one optical transit time harp whose outputs are combined at a respective input of a space-switching multiple of a second space-switching stage; and wherein outputs of a space-switching multiple of a last space-switching stage are respectively connected to inputs of a further optical transit time harp whose outputs are combined at an output of the optical switching network.

3. The optical switching network according to claim 1, wherein the outputs of a space-switching multiple form a plurality of groups of outputs whose individual outputs are connected to individual inputs of respectively one and the same transit time harp of a group of optical transit time harps; and wherein the outputs of each such transit time harp are combined to a respective output of the optical switching network.

4. The optical switching network according to claim 2, wherein outputs of a space-switching multiple of a first space-switching stage form a plurality of groups of outputs whose individual outputs are connected to individual inputs of respectively one and the same transit time harp of a group of optical transit time harps; and wherein outputs of each such transit time harp are combined to an output of the first space-switching stage connected to an input of a space-switching multiple of the last space-switching stage.

5. The optical switching network according to claim 1, wherein said space-switching multiple and said transit time harp form a first switching stage; and wherein a second switching stage is recursively realized in that corresponding concentrator outputs of a switching stage are returned to corresponding inputs of the same switching stage.

6. The optical switching network according to claim 1, wherein the optical message cells are through-connected in the space-switching multiple to the following transit time harp in accordance with the arrival of the message cells at the inputs of the space-switching multiple: such that successively arriving message cells traverse a light waveguide with a transit time equal to the zero multiple of the message cell duration up to a first-time simultaneous arrival of a plurality of message cells; such that, given a first-time simultaneous arrival of m message cells, said m message cells each respectively traverse m light waveguides of the transit time harp having transit times equal to the zero multiple through the m−1 multiple of the message cell duration; such that message cells respectively individually arriving thereafter successively traverse a light waveguide having the respectively longest transit time made use of just therebefore, whereas respectively n simultaneously arriving message cells each respectively traverse n light waveguides of the transit time harp having transit times equal to the respectively longest transit time made use of just therebefore and equal to the n−1 transit time durations that are next longest in transit time graduation; and such that, given every non-arrival of message cells, a light waveguide having a transit time shorter by one message cell duration is designated to be a current light waveguide having the longest transit time just made use of instead of the light waveguide having the respectively longest transit time just made use therebefore.

7. An optical switching network for through-connecting optical message cells and having inputs and outputs, comprising:
at least one optical space-switching multiple having inputs connected to the inputs of the optical switching network and having outputs;
at least one optical transit time harp having a plurality of light waveguides having graduated transit times of whole-number, n-multiples, where n≧0, of a message cell duration, and having inputs and outputs;
said at least one optical transit time harp having the inputs thereof connected to the outputs of said at least one space-switching multiple, the outputs of said at least one optical transit time harp being combined at the at least one output of the optical switching network via an optical multiplexer;
a plurality of space-switching stages having space-switching multiples and optical transit time harps, outputs of a space-switching multiple of a first space-switching stage being respectively connected to inputs of at least one optical transit time harp whose outputs are combined at a respective input of a space-switching multiple of a second space-switching stage, outputs of a space-switching multiple of a last space-switching stage being respectively connected to inputs of a further optical transit time harp whose outputs are combined at a predetermined output of the outputs of the optical switching network;
the outputs of a space-switching multiple forming a plurality of groups of outputs whose individual outputs are connected to individual inputs of respectively one and the same transit time harp of a group of optical transit time harps, the outputs of each such transit time harp being combined to a respective output of the outputs of the optical switching network.

8. The optical switching network according to claim 7, wherein outputs of a space-switching multiple of a first space-switching stage form a plurality of groups of outputs whose individual outputs are connected to individual inputs of respectively one and the same transit time harp of a group of optical transit time harps; and wherein outputs of each such transit time harp are combined to an output of the first space-switching stage connected to an input of a space-switching multiple of the last space-switching stage.

9. The optical switching network according to claim 7, wherein said space-switching multiple and said transit time harp form a first switching stage; and wherein a second switching stage is recursively realized in that corresponding concentrator outputs of a switching stage are returned to corresponding inputs of the same switching stage.

10. The optical switching network according to claim 7, wherein the optical message cells are through-connected in the space-switching multiple to the following transit time harp in accordance with the arrival of the message cells at the inputs of the space-switching multiple: such that successively arriving message cells traverse a light waveguide with a transit time equal to the zero multiple of the message cell duration up to a first-time simultaneous arrival of a plurality of message cells; such that, given a first-time simultaneous arrival of m message cells, said m message cells each respectively traverse m light waveguides of the transit time harp having transit times equal to the zero multiple through the m−1 multiple of the message cell duration; such that message cells respectively individually arriving thereafter successively traverse a light waveguide having the respectively longest transit time made use of just therebefore, whereas respectively n simultaneously arriving message cells each respectively traverse n light waveguides of the transit time harp having transit times equal to the respectively longest transit time made use of just therebefore and equal to the n−1 transit time durations that are next longest in transit time graduation; and such that, given every non-arrival of message cells, a light waveguide having a transit time shorter by one message cell duration is designated to be a current light waveguide having the longest transit time just made use of instead of the light waveguide having the respectively longest transit time just made use therebefore.

11. An optical switching network for through-connecting optical message cells and having inputs and at least one output, comprising:
at least one optical space-switching multiple having inputs connected to the inputs of the optical switching network and having outputs;
at least one optical transit time harp having a plurality of light waveguides having graduated transit times of whole-number, n-multiples, where n≧0, of a message cell duration, and having inputs and outputs;
said at least one optical transit time harp having the inputs thereof connected to the outputs of said at least one space-switching multiple, the outputs of said at least one optical transit time harp being combined at the at least one output of the optical switching network via an optical multiplexer;
the optical message cells being through-connected in the space-switching multiple to the following transit time harp in accordance with the arrival of the message cells at the inputs of the space-switching multiple: such that successively arriving message cells traverse a light waveguide with a transit time equal to the zero multiple of the message cell duration up to a first-time simultaneous arrival of a plurality of message cells; such that, given a first-time simultaneous arrival of m message cells, said m message cells each respectively traverse m light waveguides of the transit time harp having transit times equal to the zero multiple through the m−1 multiple of the message cell duration; such that message cells respectively individually arriving thereafter successively traverse a light waveguide having the respectively longest transit time made use of just therebefore, whereas respectively n simultaneously arriving message cells each respectively traverse n light waveguides of the transit time harp having transit times equal to the respectively longest transit time made use of just therebefore and equal to the n−1 transit time durations that are next longest in transit time graduation; and such that, given every non-arrival of message cells, a light waveguide having a transit time shorter by one message cell duration is designated to be a current light waveguide having the longest transit time just made use of instead of the light waveguide having the respectively longest transit time just made use therebefore.

12. The optical switching network according to claim 11, wherein the optical switching network further comprises a plurality of space-switching stages having space-switching multiples and optical transit time harps, and wherein outputs of a space-switching multiple of a first space-switching stage are respectively connected to inputs of at least one optical transit time harp whose outputs are combined at a respective input of a space-switching multiple of a second space-switching stage; and wherein outputs of a space-switching multiple of a last space-switching stage are respectively connected to inputs of a further optical transit time harp whose outputs are combined at an output of the optical switching network.

13. The optical switching network according to claim 11, wherein outputs of a space-switching multiple of a first space-switching stage form a plurality of groups of outputs whose individual outputs are connected to individual inputs of respectively one and the same transit time harp of a group of optical transit time harps; and wherein outputs of each such transit time harp are combined to an output of the first space-switching stage connected to an input of a space-switching multiple of the last space-switching stage.

14. The optical switching network according to claim 11, wherein the outputs of a space-switching multiple form a plurality of groups of outputs whose individual outputs are connected to individual inputs of respectively one and the same transit time harp of a group of optical transit time harps; and wherein the outputs of each such transit time harp are combined to a respective output of the optical switching network.

15. The optical switching network according to claim 11, wherein said space-switching multiple and said transit time harp form a first switching stage; and wherein a second switching stage is recursively realized in that corresponding concentrator outputs of a switching stage are returned to corresponding inputs of the same switching stage.

* * * * *